(12) United States Patent
Nicholls

(10) Patent No.: US 6,489,898 B1
(45) Date of Patent: Dec. 3, 2002

(54) DESIRED RATE OF TURN BANK ANGLE INDICATOR

(75) Inventor: James Nicholls, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/713,903

(22) Filed: Nov. 16, 2000

(51) Int. Cl.⁷ .............................................. G01C 23/00
(52) U.S. Cl. ....................... 340/975; 340/974; 340/978; 701/4
(58) Field of Search ................................ 340/945, 967, 340/971, 973, 974, 975, 980; 701/4, 5, 14

(56) References Cited

U.S. PATENT DOCUMENTS

| | | | | |
|---|---|---|---|---|
| 4,161,884 A | * | 7/1979 | Shigenobu | 73/504 |
| 4,682,171 A | * | 7/1987 | Nakamura | 340/975 |
| 5,095,746 A | * | 3/1992 | Stanis | 73/178 R |
| 5,841,370 A | * | 11/1998 | Lempicke | 340/975 |
| 6,057,786 A | * | 5/2000 | Briffe et al. | 340/975 |
| 6,088,654 A | * | 7/2000 | Lepere et al. | 701/301 |

* cited by examiner

Primary Examiner—Brent A. Swarthout (57) ABSTRACT

The present invention provides an alternative means of displaying aircraft flight information traditionally provided by a standalone rate of turn indicator on the aircraft instrumentation panel. The bank angle effective to achieve a rate of turn equal to a desired rate of turn for an aircraft is displayed to the pilot by generating and displaying one or more bank angle markers on the roll scale of an aircraft attitude indicator. The position of the desired rate of turn bank angle markers may be updated continuously as a function of airspeed and other flight parameters. The present invention enables a pilot to perform a coordinated turn at a desired rate of turn without having to reference a separate rate of turn indicator on the instrumentation panel and/or without having to independently calculate the associated bank angle according to any known "rule of thumb" or other estimation method.

25 Claims, 6 Drawing Sheets

DESIRED RATE OF TURN BANK ANGLE INDICATOR

FIELD OF THE INVENTION

The present invention relates generally to aircraft instrumentation systems. More particularly, the present invention relates to an indicator for displaying the bank angle effective to achieve and maintain a desired rate of turn for an aircraft.

BACKGROUND OF THE INVENTION

The prior art is replete with various aircraft flight control instruments and displays. These instruments and displays use a combination of alphanumeric and graphical information to indicate the state of the vehicle. The primary flight parameters that are displayed to a pilot are traditionally regarded as being pitch and roll attitude, altitude, airspeed and heading. Secondary parameters may include vertical speed, rate of turn and various navigation and engine related parameters. A number of mechanisms have been devised for presenting this information to the pilot. Early aircraft generally use dedicated instruments for each of these parameters. Modern display technology, however, allows multiple parameters to be presented on a single display. Such flight control displays, which may be of the panel-mounted variety (e.g., heads down display or HDD) or of the heads up display (HUD) variety, are commonly found in commercial, military, and civilian aircraft.

To control an aircraft, a pilot must maintain a high level of awareness of the state of the vehicle and, in particular, the primary flight parameters. To achieve this the pilot must typically continuously and rapidly scan the instrument panel to locate and interpret the displays of the primary flight parameters. The pilot also typically periodically glances at the secondary displays, although this task can be performed at a lower rate than the monitoring of the primary displays. The continual, fast, repetitive scan of the primary flight instruments constitutes a significant workload for the pilot. The difficulty of this task may be compounded by stress and other abnormal or adverse conditions encountered by aircraft operators. When overtaxed, pilots may incorrectly interpret or be confused by even the simplest data and may fail to act, or, conversely, may tend to overreact under the circumstances.

A further common difficulty is that of fixation on a single instrument whose indicated parameter may have excessively varied from a desired value. This type of fixation frequency results in inordinate variation in parameters displayed on other instruments, because of the excessive concentration devoted to the correction of the first-discovered or discrepant parameter.

The workload of the pilot and the probability of pilot error may be mitigated by presenting data to the pilot in a manner that simplifies interpretation and minimizes the effort required to gather the required data.

During instrument flight, certain regulatory authorities, such as the Federal Aviation Administration (FAA), generally direct pilots to perform procedure turns at a standard rate of turn, such as, for example, at a heading change rate of three degrees per second. For some aircraft, the standard rate of turn may be some multiple of this number. For the purposes of this discussion, the FAA standard rate of turn for aircraft, or other appropriate rate of turn, will be referred to as the desired rate of turn of the aircraft. Traditionally, the rate of turn of an aircraft has been displayed on a dedicated scale with markers placed at predefined points, such as, for example, at the ±3 degrees per second points on the scale. Such a dedicated scale has been located in a variety of positions on prior art instrumentation panels, such as, for example, on a linear scale below the aircraft attitude indicator and/or on a separate gauge on the instrument panel.

Even though during instrument flight a pilot's focus must remain on the primary flight instruments while turning, the pilot is also responsible for maintaining the required rate of turn. It is possible for the pilot to maintain a constant rate of turn by maintaining a constant airspeed and roll attitude. To perform a turn, a pilot rolls an aircraft in the direction of the turn to a bank angle approximating the bank angle effective that required to achieve the desired rate of turn. A glance at the rate of turn indicator can then be used to confirm whether the desired rate of turn has been achieved. The roll attitude can then be adjusted to achieve the desired rate of turn. Having achieved the desired rate of turn, the pilot can then complete the maneuver without further reference to the rate of turn indicator by simply maintaining a constant roll attitude and airspeed. This process, however, generally causes the pilot to divert attention away from the primary instruments.

To obtain the initial estimate of the roll attitude (i.e., bank angle) effective to achieve the desired rate of turn of 3 degrees per second, pilots have commonly used a well-known "rule of thumb" during aircraft operation to calculate this effective bank angle:

$$(V \div 10) + 7$$

Thus, for example, using this "rule of thumb," the pilot of an aircraft flying level (i.e., neither climbing nor descending) at 150 knots would roll the aircraft to a bank angle of 22 degrees to achieve a standard rate of turn of 3 degrees per second.

For a coordinated level turn, the rate of turn is typically a function of the speed of the aircraft and the bank angle as shown in Equation 1:

$$R.O.T. \tan(\theta)/V$$

where $\theta$ = bank angle, degrees

V = Velocity, True Air Speed (TAS)

R.O.T. = Rate of Turn, degrees per second (See Hurt, H.H. Jr., *Aerodynamics for Naval Aviators*. US Navy: NAVWEPS 00-80T-80 (1965)).

Given the speed of the aircraft, it is possible to calculate the bank angle effective to achieve a desired rate of turn by solving the above Equation 1 for the bank angle. This gives Equation 2:

$$\theta \tan_{-1}(R.O.T. \times V)$$

Figure 1:
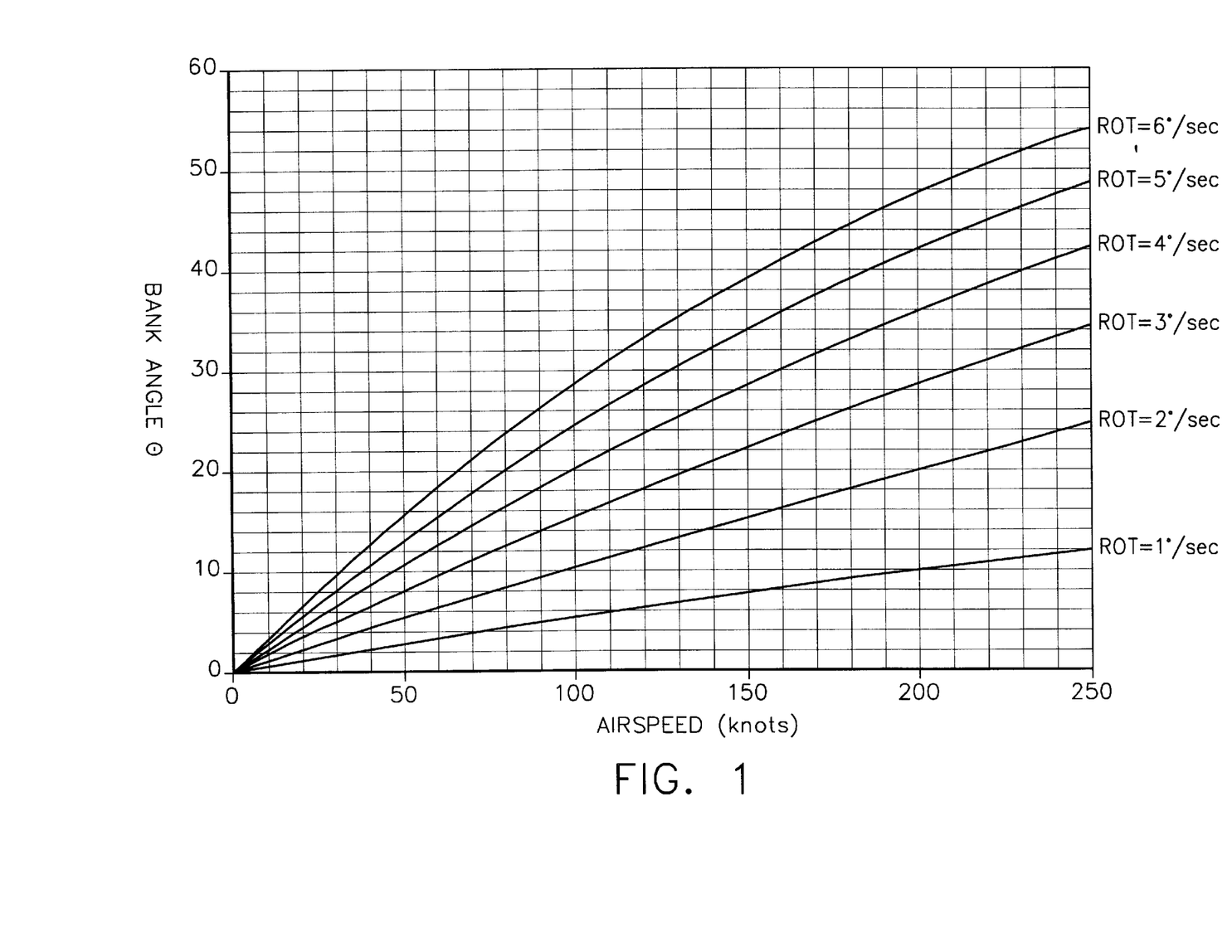
FIG. 1 is a chart showing the relationship between airspeed and required bank angle for a number of different values of desired rate of turn.

FIG. 1 shows a plot of bank angle ($\theta$) as a function of airspeed (V) for a number of different desired rates of turn.

A method of integrating display of the bank angle derived from the above equation or other appropriate algorithm relating bank angle to rate of turn with the pilot's attitude display would allow the pilot to perform a rate turn without diverting attention away from the primary instruments to monitor the rate of turn. A secondary benefit would be the possibility for removal of the standalone rate of turn indicator, thus decreasing cluttering of the instrument panel.

BRIEF SUMMARY OF THE INVENTION

It is, therefore, a general aspect of the instant invention to provide for a single display on which certain critical flight and navigational parameters are simultaneously displayed and to do so in a manner which is intuitively simple for the pilot to use and to interpret, thus enhancing pilot efficiency and safety.

Various embodiments of the present invention provide alternative techniques of displaying aircraft flight information traditionally provided by a standalone rate of turn indicator. The proposed invention not only addresses the problems of space shortage on aircraft display panels, but it also more directly answers a pilot's question during flight as to what bank angle must be maintained in order to achieve a desired rate of turn at a particular airspeed. Specifically, the proposed invention includes an integral directional marker that is easy to detect and to interpret by the pilot.

In an exemplary embodiment of the present invention, the bank angle effectual to achieve a desired rate of turn is displayed to the pilot by generating and displaying one or more bank angle markers on the roll scale of the aircraft attitude indicator. The position of the desired rate of turn bank angle markers may be updated continuously as a function of airspeed. The present invention enables a pilot to perform a coordinated turn at the desired rate of turn without having to reference a separate indicator and without having to resort to the traditional "rule of thumb."

In a further aspect of one embodiment of the present invention, the desired rate of turn indicator may be designed to compensate for non-level flight and to reflect this in calculating the position of the desired rate of turn bank angle markers. To compensate for non-level flight in calculating the position of the desired rate of turn bank angle markers, it is useful to incorporate factors such as the vertical acceleration of the aircraft into the equation for calculation of the roll angle effective to maintain a desired rate of turn.

The various aspects and embodiments of the present invention described in detail herein assume that the pilot is performing a coordinated turn. Certain aircraft, such as, for example, helicopters, can perform uncoordinated turns, or pedal turns, at low airspeeds. The desired rate of turn bank angle indicator of the present invention may not provide useful information during an uncoordinated turn. Moreover, obtaining accurate airspeed data at very low airspeeds may be difficult due to limitations of some airspeed sensors. In light of these limitations, the desired rate of turn bank angle markers may be removed from the display when the aircraft is traveling at a low airspeed.

BRIEF DESCRIPTION OF THE DRAWINGS

A more complete understanding of the present invention may be obtained by referring to the detailed description and claims when considered in connection with the following illustrative FIGURES, wherein like reference numbers refer to similar elements throughout the FIGURES and:

DETAILED DESCRIPTION OF EXEMPLARY EMBODIMENTS

The present invention may be described herein in terms of functional block components and various processing steps. It should be appreciated that such functional blocks may be realized by any number of hardware components configured to perform the specified functions. For example, the present invention may employ various integrated circuit components, for example, memory elements, digital signal processing elements, logic elements, display elements, and the like, which may carry out a variety of functions under the control of one or more microprocessors or other control devices. In addition, those skilled in the art will appreciate that the present invention may be practiced in conjunction with any number of vehicular instrumentation systems and that the aircraft flight system described herein is merely one exemplary application for the invention.

It should be appreciated that the particular embodiments shown and described herein are illustrative of the invention and its best mode and are not intended to otherwise limit the scope of the present invention in any way. Indeed, for the sake of brevity, conventional techniques and components related to aircraft attitude detection, flight instrumentation, liquid crystal displays, HUDs, image rendering, landing and guidance methodologies, and other functional aspects of the systems (and components of the individual operating components of the systems) may not be described in detail herein. Furthermore, the display images shown in the various figures are illustrative in nature and are not intended to limit the scope or applicability of the present invention in any way.

Figure 2:
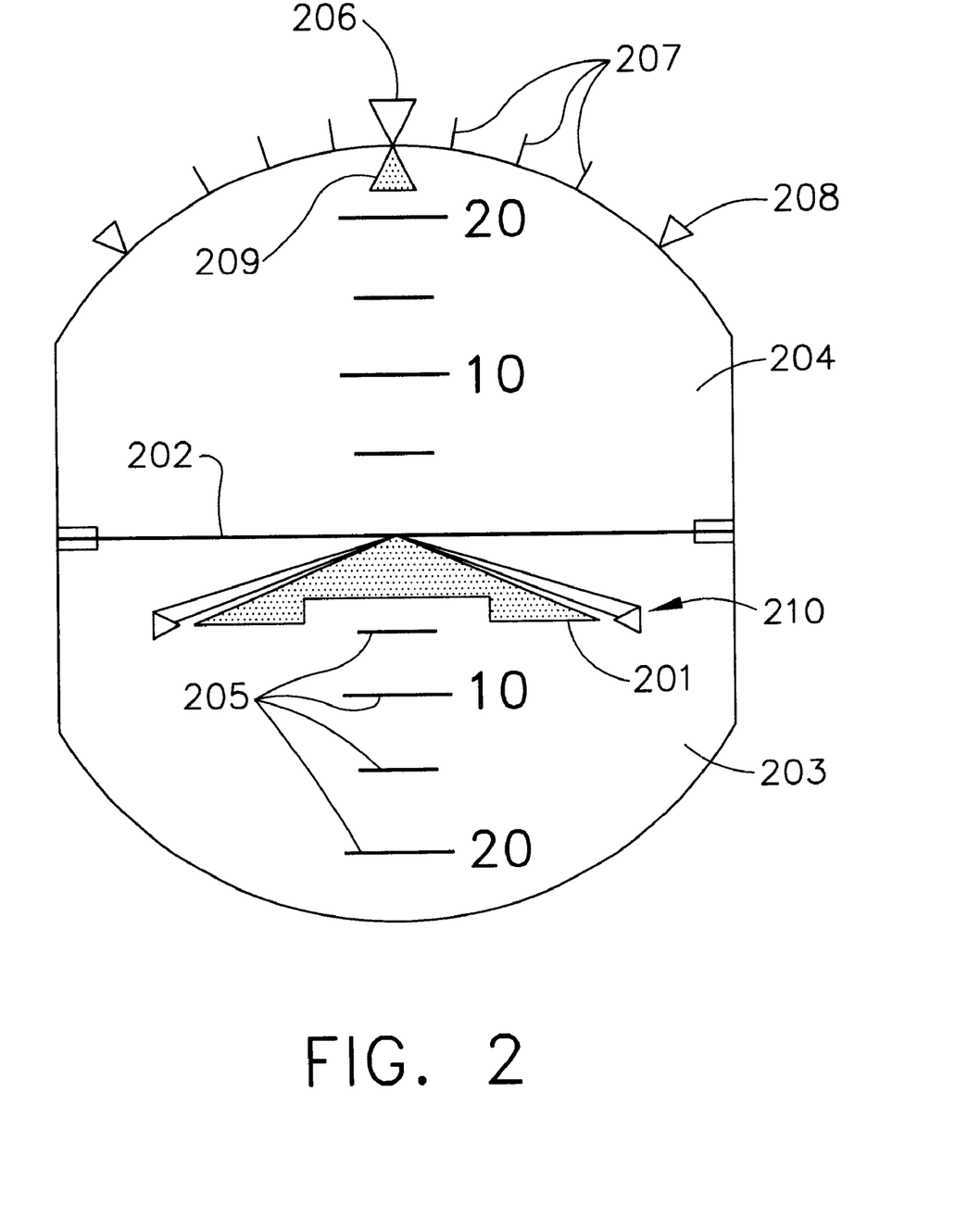
FIG. 2 illustrates a typical attitude indicator found in many prior art aircraft.

Displays present information to viewers in many different formats. Oftentimes, displays are used in avionics, transportation, or communications, for example, for presenting operational information to a viewer. It is generally desirable to have the information presented in an easily viewable and organized manner. FIG. 2 illustrates an exemplary panel-mounted heads down display (HDD) 200 used in avionics for displaying flight information. HDD 200 communicates various flight information to a viewer, such as a pilot.

Figure 6:
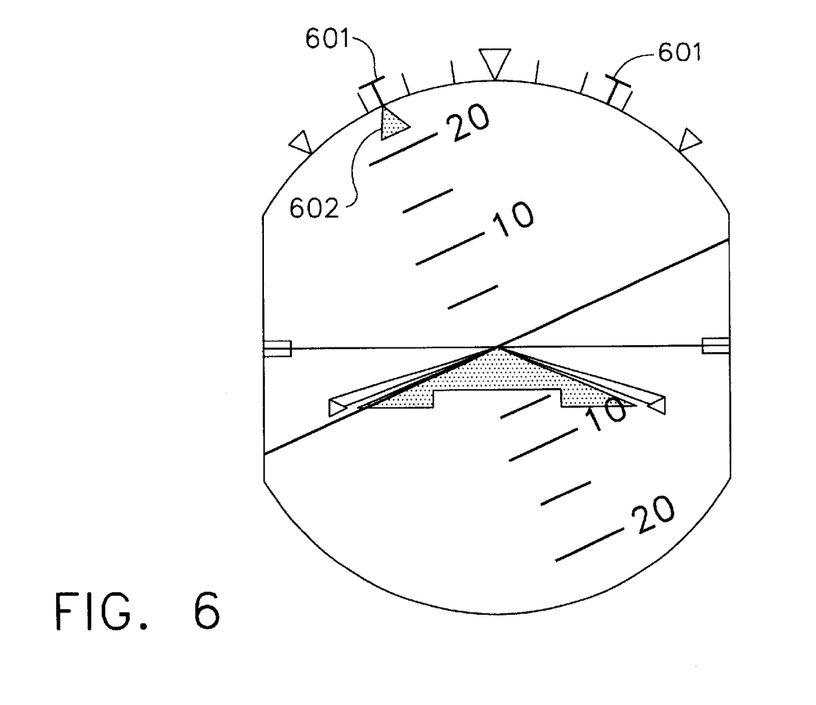
FIG. 6 is an illustration of a desired rate of turn bank angle indicator configured in accordance with one embodiment of the present invention as it may appear when the aircraft is banked to perform a turn at the desired rate.

FIG. 2 is a representative display of an attitude indicator as may be found in some prior art aircraft. Generally, display 200 is an attitude indicator used to pictorially represent aircraft pitch and roll attitudes. The central component of the attitude indicator is an "attitude sphere" including regions 203 and 204, together with a horizon line 202. These items are intended to be representative of the ground, the sky and the horizon, respectively. Region 203 is typically shown using a brown color to represent the Earth, while region 204 is typically shown using a blue color to represent the sky. The attitude of the aircraft with respect to horizon line 202 is shown by symbolic aircraft 201. A "pitch tape" 205 includes a vertical scale that indicates the aircraft pitch attitude with respect to a horizontal plane. A roll angle pointer 209 indicates the roll attitude of the aircraft with respect to the roll scale comprised of fixed markers 206, 207 and 208. Fixed marker 206 indicates zero degrees roll attitude, or an aircraft position of wings level with the horizon. Fixed markers 207 may provide markings, for example, at increments of ten degrees, or any other increments of appropriate units of measurement. In this exemplary embodiment, fixed marker 208 indicates a 45 degree roll attitude. FIG. 2 depicts a situation where the aircraft has zero degrees pitch and zero degrees roll attitude. If the aircraft attitude changes such that the nose pitches upward, horizon line 202 would move downward, such that symbolic aircraft 205 appears above horizon line 202. Conversely, for a downward pitch, horizon line 202 would move upward. Changes in roll attitude are indicated by a rotation of the horizon line. This phenomenon is illustrated in FIG. 6, for example. Flight director bars 210 are used to display to the pilot steering commands from the navigation system. While details of symbology or location of markings on the display may change from implementation to implementation, FIG. 2 is intended to represent an attitude indicator currently found in some aircraft. The manner in which the attitude indicator depicted in FIG. 2 displays changes in roll is well known to those skilled in the art.

Figure 3:
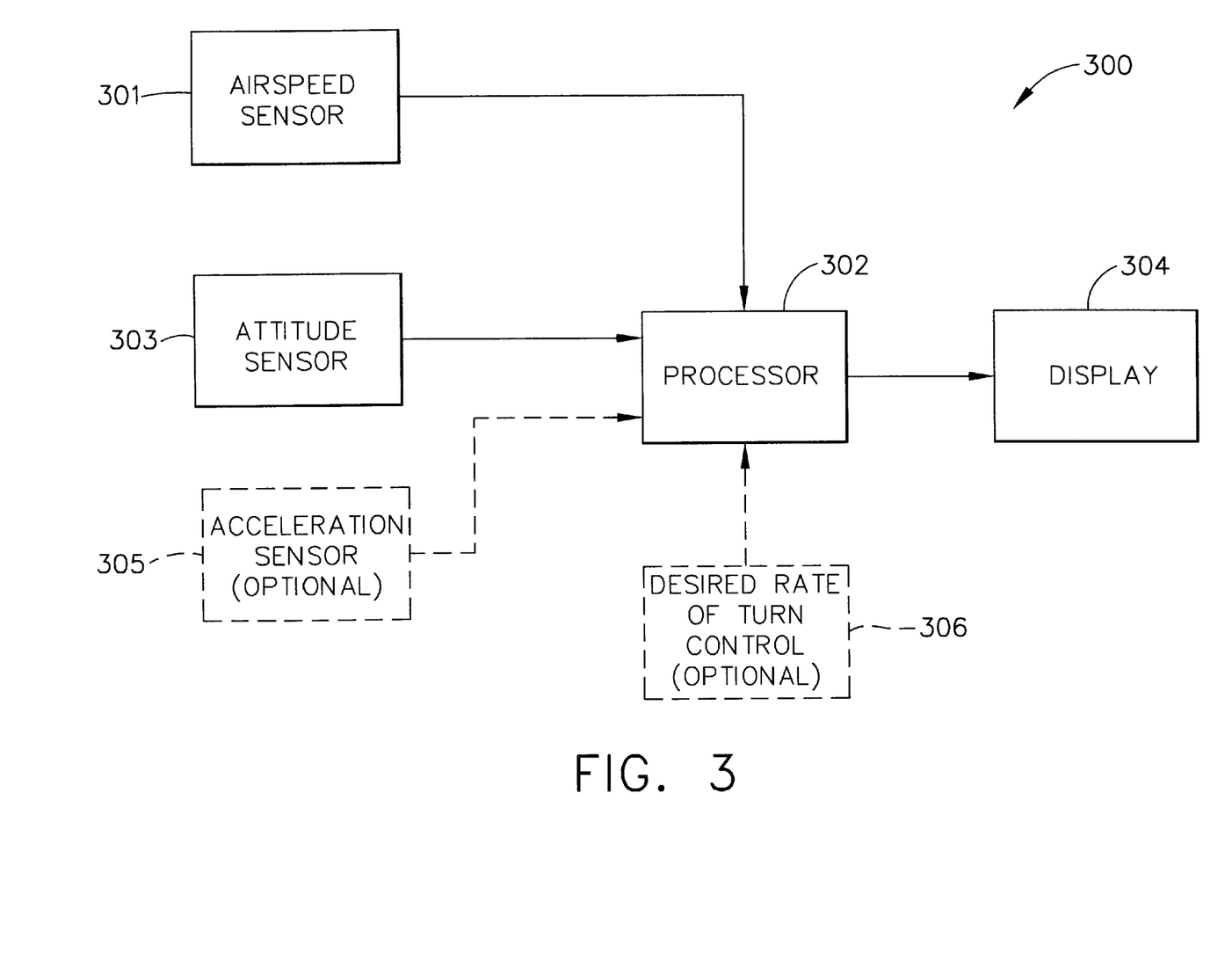
FIG. 3 is a schematic block diagram of an aircraft display system that may incorporate one or more features of the present invention.

Referring now to FIG. 3, a desired rate of turn bank angle indicator system 300 in accordance with one embodiment of the invention may generally include a processor 302 and a display element 304. In one aspect of an exemplary embodiment of the invention, processor 302 may include or cooperate with a speed detection element 301 that is capable of determining the speed of the vehicle. In accordance with another preferred aspect of this invention, processor 302 is further configured to receive and process information 303 associated with the position and/or attitude the vehicle relative to one or more reference locations, points, planes, or targets, such as, for example, the angle of ascent or descent of an aircraft. This information may be provided by, for example, an inertial reference system, a global positioning system, an air data computer, a flight management computer, and/or any other source.

Processor 302 may include any number of microprocessor elements, memory elements, power supplies, and other functional components as necessary to support the operation of system 300. In this respect, processor 302 may include or cooperate with any number of software programs or instructions designed to carry out various methods, process tasks, calculations, control functions, and the generation of display signals and other data used by display element 304. In particular, processor 302 may be configured to generate position information associated with the position of the aircraft relative to at least one reference location. Such processors and flight control computers are available from a number of manufacturers, such as Honeywell International, Inc., of Phoenix, Ariz.

The attitude data provided by detection element 303 may include the following parameters: the pitch of the aircraft relative to a reference point or plane, such as, for example, the horizon; the roll of the aircraft relative to its longitudinal axis; the yaw angle of the aircraft relative to a specific heading; and the like. In accordance with the present invention, it is also possible for a desired rate of turn bank angle indicator to compensate for non-level flight (i.e., climb or descent), if required, by incorporating vertical acceleration data for the aircraft into the process of generating the appropriate positions of the bank angle markers, as described below. This is illustrated by an optional acceleration sensor element 305. In some embodiments, this acceleration sensor may be integrated with the attitude sensor element 303. Detection elements 303 and 305 may utilize well known techniques and commercially available components that are suitably configured to generate the position data. A desired rate of turn control 306 may be incorporated into system 300 to enable designers to preset the standard or default rate of turn of the aircraft and/or enable users (e.g., pilots) to select and/or input a desired rate of turn for the system before or during flight. Control 306 may be implemented, for example, as software instructions to the processor or as stored in memory.

Display element 304 may be based on a panel-mounted display, a HUD projection, or any conventional technology. In addition to the enhanced features and indicia described in more detail below, display element 304 may include any number of conventional elements, for example, visual indicators, alphanumeric text, lights, audio signals and the like. In one aspect of the invention, display element 304 may receive one or more position signals and generate a viewable image in response to the position signal. In this context, the position signal may be representative of speed and/or position information that has been obtained and processed by processor 302.

Figure 4:
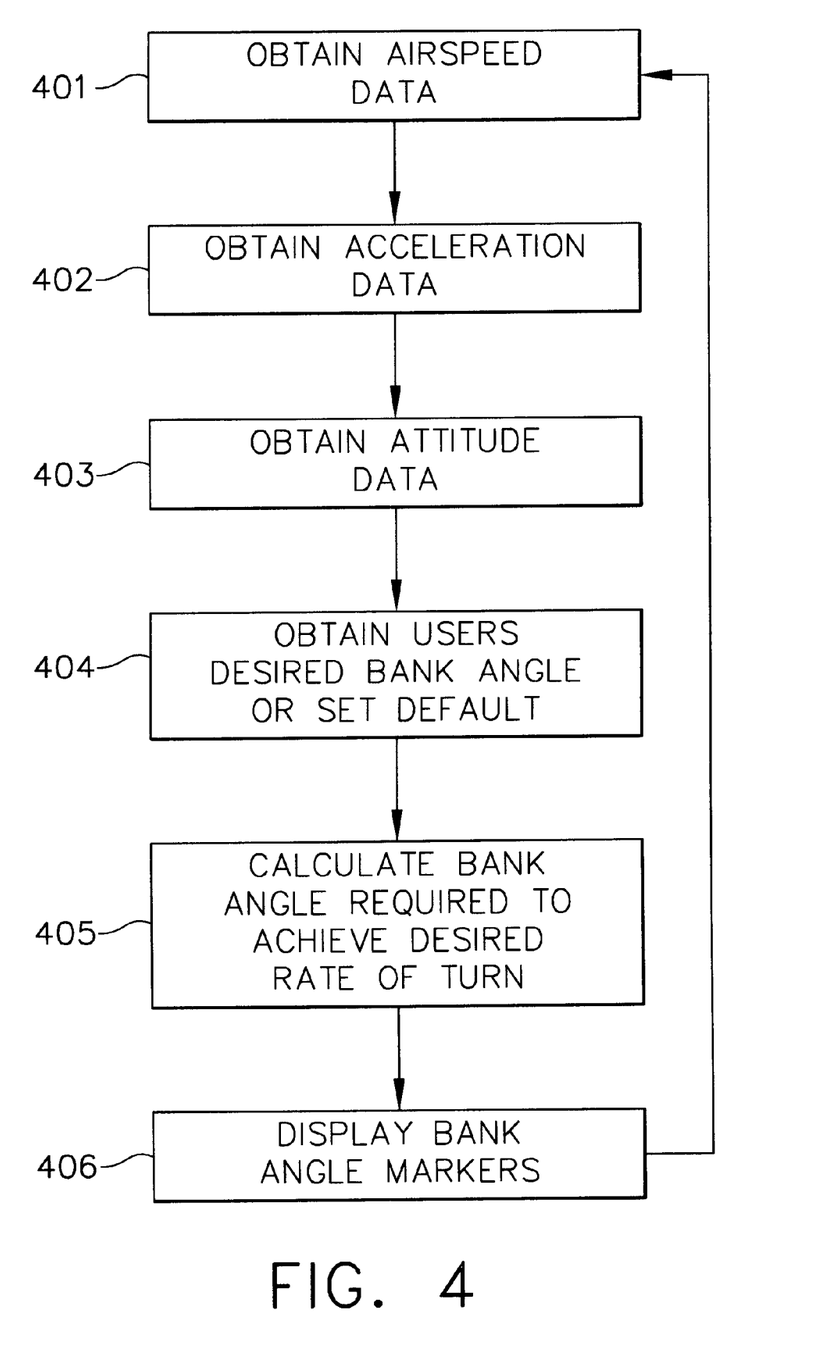
FIG. 4 is a flow diagram depicting a desired rate of turn indication process that may be performed by a system configured in accordance with the present invention.
Figure 7:
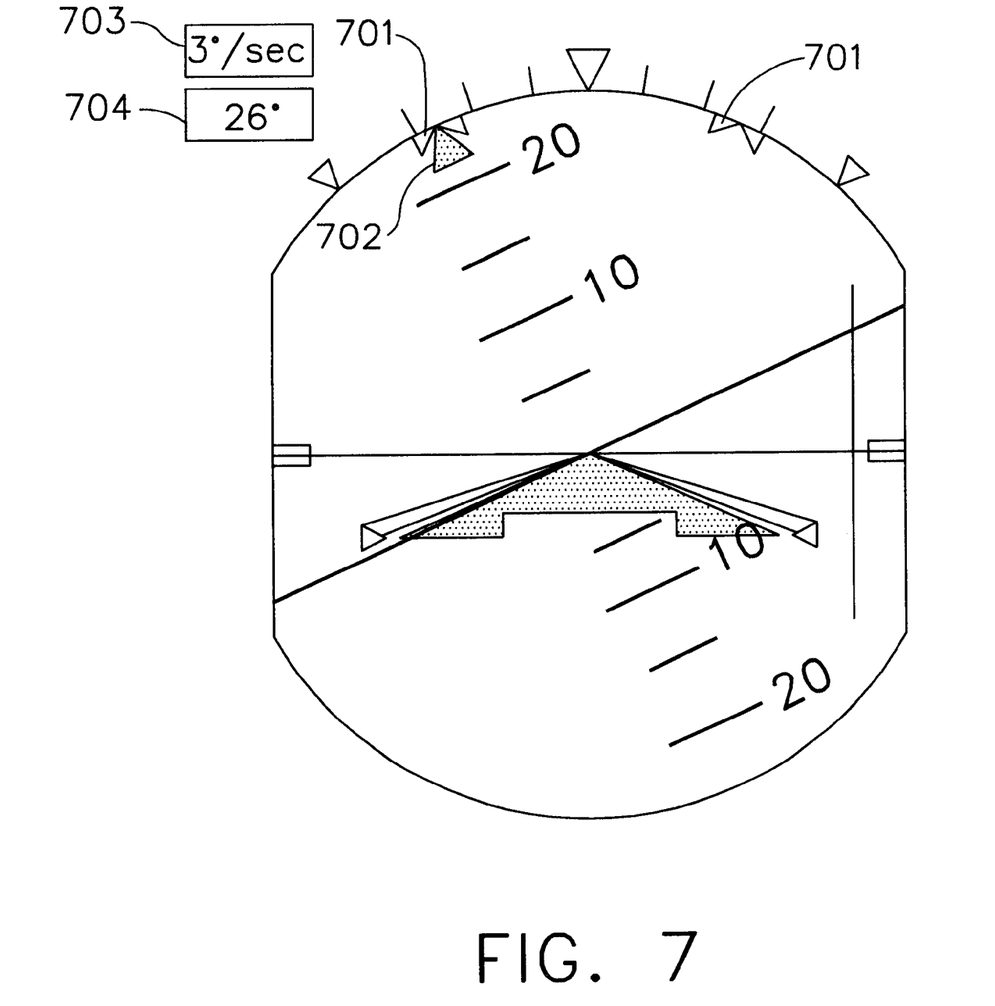
FIG. 7 is a schematic representation of a desired rate of turn bank angle indicator display element configured in accordance with another possible embodiment of the present invention.

FIG. 4 is a flow diagram depicting an exemplary desired rate of turn bank angle indication process 400 that may be performed by a system 300 configured in accordance with the present invention. In step 401, a suitable processor, such as processor 302 in FIG. 3, collects vehicle speed data from a suitable speed detector, such as speed detection element 301. Optionally, in step 402, additional vehicle performance data are obtained from a suitable detector, such as an acceleration sensor element 305. Additional vehicle performance data obtained in step 402 may include, for example, rate of aircraft ascent/descent and/or rate of aircraft acceleration/deceleration. Such data are then relayed to the processor, which may be electronically coupled thereto, via, for example, an integrated software program designed to achieve the data communication and computation processes set forth herein. In step 403, the processor 302 obtains aircraft attitude data reflected in the display of the attitude sphere and the roll pointer. In step 404, the preset default rate of turn or the user's preselected desired rate of turn is obtained, such as from a control 306 discussed in accordance with FIG. 3. Such data for use in connection with step 404 may be obtained from, for example, data stored in memory, a data input device such as, for example, a keyboard for keypad, or from any other appropriate software instructions capable to handling such data. In step 405, the processor then calculates the bank angle required for the vehicle to achieve the desired rate of turn, based on the speed, acceleration and attitude data obtained in steps 401 through 403. The algorithms used to perform the calculations of step 405 may include any suitable algorithms known. In step 406, bank angle markers, such as bank angle markers 501 in FIG. 5 or bank angle markers 701 in FIG. 7 are generated and displayed in accordance with the above description of the invention. In a practical application, the various steps associated with bank angle indication process 400 may be performed in a concurrent manner such that the display, including, for example, the bank angle markers, is continuously and dynamically updated according to the current flight conditions. As mentioned above, process 400 may be realized by a suitable software application resident in processor 302 (see FIG. 3).

Figure 5:
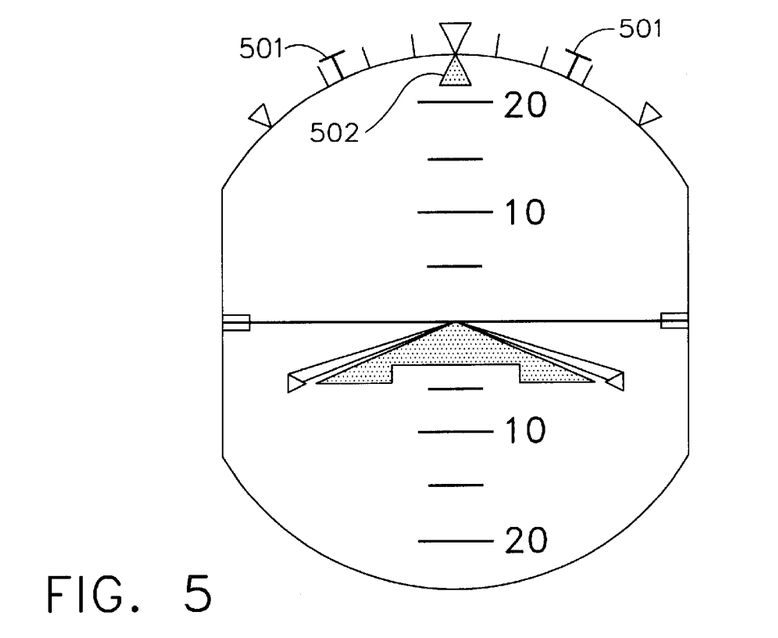
FIG. 5 is a schematic representation of a desired rate of turn indicator display element configured in accordance with one embodiment of the present invention.

FIG. 5 illustrates an exemplary embodiment of the present invention. Display 500 includes bank angle markers 501 used to indicate to the pilot the roll attitude effective to achieve and to maintain the desired rate of turn. A pilot may perform a coordinate turn at the desired rate of turn by rolling the aircraft until a roll pointer 502 is aligned with desired rate of turn bank angle markers 501. This is shown in FIG. 6, which illustrates a desired rate of turn bank angle indicator configured in accordance with one embodiment of the present invention as it may appear when an aircraft is banked to perform a turn at the desired rate of turn. FIG. 6 shows a roll pointer 602 aligned with one of desired rate of turn bank angle markers 601. In a practical application, the aircraft flight parameters (e.g., airspeed, pitch, acceleration, etc.) change, the positions of desired rate of turn bank angle markers 601 are continually updated to indicate the bank angle effective to maintain the desired rate of turn. Thus, a pilot may accurately maintain a desired rate of turn even during flight parameter changes while turning by simply ensuring that roll pointer 602 remains aligned with one of desired rate of turn bank angle markers 601.

FIG. 7 illustrates aspects of yet another alternative embodiment of the present invention. Bank angle markers 701 are configured to illustrate possible alternative symbology. This alternative symbology enables a pilot to align a rate of turn pointer 702 with a notch in one of bank angle markers 701. In one aspect of this embodiment, a numerical readout 703 is used to annunciate to the pilot a selected or calculated value for the desired rate of turn. Such an annunciation may be useful, for example, if the pilot is provided with a control that allows the pilot to select this value. Numerical readout 703 may be digital or analog, and may be configured in any manner suitable to convey information to a pilot. For example, readout 703 may include a LED, or LCD, on a HDD or a computer-generated image on a HUD. In a further aspect of this embodiment, a digital readout 704 of the bank angle effective to perform a turn at the desired rate of turn is provided either alone or in combination with readout 703. Using readout 704 as a reference, a pilot would roll the aircraft to the angle indicated therein as it is displayed on the conventional aircraft flight panel. Readout 704 may be employed on the display as a substitute for, or a supplement to, bank angle markers 701.

The present invention enables a vehicle operator, such as a pilot, to perform a coordinated turn at a desired rate of turn without having to reference a separate indicator and without having to resort to a "rule of thumb" or other estimation method. For example, during flight, a pilot may only reference the features of display 500 and still accurately determine how to position an aircraft to achieve a desired rate of turn. In a practical application, a pilot need only position the aircraft such that roll pointer 502 is aligned with one of the bank angle markers 501 (the choice of which depending upon whether a clockwise or counterclockwise turn is desired). By maintaining the position of the aircraft such that roll pointer 502 and bank angle marker 501 remain aligned, the pilot may be made more confident that the aircraft is turning at the desired rate of turn.

The exemplary displays illustrated herein may be incorporated within a larger display element, and/or may include any number of related or independent display elements, control elements, or instrumentation. The displayed features described herein may be suitably rendered on displays of the present invention in accordance with any number of known techniques.

The bank angle markers, as depicted in FIGS. 5, 6 and 7, exhibit exemplary configurations; however, the configuration, size, shape, color, color intensity, and other characteristics of the bank angle markers employed in accordance with the present invention may be chosen from among innumerable options as may be appropriate for the particular application of the invention.

Thus, the present invention provides methods and apparatus for viewing information on a display. The present invention has been described above with reference to a number of exemplary embodiments. However, those skilled in the art having read this disclosure will recognize that changes and modifications may be made to the exemplary embodiments without departing from the scope of the present invention. For example, although reference has been made throughout to "aircraft," it is intended that the invention also be applicable to vehicles that are on the ground, in the water, in the air, or in space. Accordingly, these and other changes or modifications are intended to be included within the scope of the present invention, as expressed in the following claims. No element described herein is essential to the practice of the invention unless expressly described as "essential" or "required."

What is claimed is:

1. A system for displaying the position of a vehicle, comprising:
    a processor configured to receive and process position information of said vehicle, said position information comprising information associated with the rate of turn of said vehicle;
    a display element configured to receive at least one position signal representative of said position information and to generate viewable images in response to said at least one position signal, said viewable images comprising:
        a scale comprising a plurality of markers, wherein each of the plurality of markers correlates to a value for a desired vehicle bank angle; and
        a value indicator positioned on said scale and configured to convey the value of the actual vehicle bank angle;
    wherein the processor is operable to substantially continuously and dynamically update the values for said desired vehicle bank angle and said actual vehicle bank angle on the display element during operation of said vehicle according to changing vehicle speed and position information.

2. A system according to claim 1, wherein said desired vehicle bank angle is the vehicle bank angle effective to achieve a desired vehicle rate of turn.

3. A system according to claim 2, wherein said desired vehicle rate of turn is determined by a regulatory authority.

4. A system according to claim 2, wherein said desired vehicle rate of turn is approximately ±3 degrees per second.

5. A system according to claim 1, wherein said vehicle is an aircraft.

6. A system according to claim 5, wherein said processor is configured to receive and process position information associated with the rate of turn of said vehicle from at least one of: a global positioning system, an inertial reference system, an air data computer, a flight management computer, and a digital memory source.

7. An aircraft flight control display comprising the system of claim 1.

8. An apparatus for displaying the position of a vehicle, comprising:
    a display element configured to generate viewable images associated with the position of said vehicle, said viewable images comprising:
        a scale comprising a plurality of markers, wherein each of the plurality of markers correlates to a value for a desired vehicle bank angle; and
        a value indicator positioned on said scale and configured to convey the value of the actual vehicle bank angle, wherein the display element is operable to substantially continuously and dynamically update the values for said desired vehicle bank angle and said actual vehicle bank angle during operation of said vehicle according to changing vehicle speed and position information.

9. An apparatus according to claim 8, wherein said display element is further configured to generate viewable images associated with the rate of turn of said vehicle.

10. An apparatus according to claim 8, wherein said desired vehicle bank angle is the vehicle bank angle effective to achieve a desired vehicle rate of turn.

11. An apparatus according to claim 10, wherein said desired vehicle rate of turn is determined by a regulatory authority.

12. An apparatus according to claim 10, wherein said desired vehicle rate of turn is approximately ±3 degrees per second.

13. An apparatus according to claim 8, wherein said vehicle is an aircraft.

14. An aircraft flight control display comprising the apparatus of claim 8.

15. An apparatus for viewing information associated with the position of a vehicle, comprising:

a display element configured to generate viewable images associated with the position of said vehicle;

first indicia on said display, wherein said first indicia conveys a desired vehicle bank angle; and second indicia on said display, wherein said second indicia conveys the value of the actual vehicle bank angle, wherein the display element is operable to substantially continuously and dynamically update the values for said desired vehicle bank angle and said actual vehicle bank angle during operation of said vehicle according to changing vehicle speed and position information.

16. An apparatus according to claim 15, wherein said desired vehicle bank angle is the vehicle bank angle effective to achieve a desired vehicle rate of turn.

17. An apparatus according to claim 15, wherein said first indicia comprises a numerical readout display.

18. An apparatus according to claim 15, wherein said second indicia comprises a numerical readout display.

19. A method for indicating the position of a vehicle with a display clement configured to generate viewable images associated with the position of said vehicle, said method comprising the steps of:

(a) receiving information associated with the position of said vehicle;

(b) receiving information associated with the speed of said vehicle;

(c) processing said speed and position information to generate a value for a desired vehicle bank angle;

(d) generating a first viewable image on said display element, wherein said first viewable image conveys a value for a desired vehicle barn angle; and (e) generating a second viewable image on said display element wherein said second viewable image conveys the value of the actual vehicle bank angle, wherein steps (a), (b), (c), (d) and (e) are repeated during operation of said vehicle such that the values for said desired vehicle bank angle and said actual vehicle bank angle are substantially continuously and dynamically updated according to changing vehicle speed and position information.

20. A method according to claim 19, wherein step (a) comprises receiving information associated with at least one of vehicle pitch, acceleration rate, deceleration rate, rate of ascent, rate of descent, and roll attitude.

21. A method according to claim 19, wherein step (c) comprises processing said speed and position information to generate a value for a vehicle bank angle effective to achieve a desired vehicle rate of turn.

22. A method according to claim 19, wherein step (d) further comprises generating a first viewable image that conveys a value for a vehicle bank angle effective to achieve a desired vehicle rate of turn.

23. A method according to claim 19, wherein step (d) further comprises generating a first viewable image that conveys a value for a vehicle bank angle effective to achieve vehicle rate of turn of approximately ±3 degrees per second.

24. A method according to claim 19, wherein step (d) generates a viewable scale comprising a plurality of markers, wherein each of said plurality of markers correlates to a value for a vehicle bank angle effective to achieve a desired vehicle rate of turn.

25. A method according to claim 19, wherein step (d) generates a numerical readout display, wherein said numerical readout display conveys a value for a vehicle bank angle effective to achieve a desired vehicle rate of turn.

* * * * *